United States Patent
Chen et al.

(10) Patent No.: US 9,983,818 B2
(45) Date of Patent: May 29, 2018

(54) INDIVIDUAL IDENTIFICATION DEVICE, STORAGE DEVICE, INDIVIDUAL IDENTIFICATION SYSTEM, METHOD OF INDIVIDUAL IDENTIFICATION, AND PROGRAM PRODUCT

(71) Applicant: TOSHIBA MEMORY CORPORATION, Tokyo (JP)

(72) Inventors: Jiezhi Chen, Kanagawa (JP); Yuuichiro Mitani, Kanagawa (JP); Tetsufumi Tanamoto, Kanagawa (JP); Takao Marukame, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 61 days.

(21) Appl. No.: 15/056,133

(22) Filed: Feb. 29, 2016

(65) Prior Publication Data

US 2016/0179431 A1    Jun. 23, 2016

Related U.S. Application Data

(63) Continuation of application No. PCT/JP2014/074765, filed on Sep. 12, 2014.

(30) Foreign Application Priority Data

Sep. 18, 2013 (JP) ................. 2013-193542

(51) Int. Cl.
G06F 3/06 (2006.01)
G06F 21/73 (2013.01)
(Continued)

(52) U.S. Cl.
CPC .......... *G06F 3/0631* (2013.01); *G06F 3/0604* (2013.01); *G06F 3/0622* (2013.01);
(Continued)

(58) Field of Classification Search
None
See application file for complete search history.

(56) References Cited

U.S. PATENT DOCUMENTS

2003/0160715 A1    8/2003    Maeda et al.
2003/0200406 A1    10/2003   Kouno
(Continued)

FOREIGN PATENT DOCUMENTS

JP    7-320499      12/1995
JP    2000-235636    8/2000
(Continued)

OTHER PUBLICATIONS

International Search Report issued by the Japanese Patent Office in International Application No. PCT/JP2014/074765, dated Nov. 18, 2014 (2 pages).
(Continued)

*Primary Examiner* — Denise Tran
(74) *Attorney, Agent, or Firm* — Finnegan, Henderson, Farabow, Garrett & Dunner, L.L.P.

(57) ABSTRACT

An individual identification device (1) according to embodiments may identify a storage device (100) including one or more memory chips (40). The device comprises a first storage (40), a region allocator (15), and a hardware fingerprint generator (12). The first storage may be configured to store write data. The region allocator may be configured to write the write data in a specific region in each memory chip. The hardware fingerprint generator may be configured to generate hardware fingerprint data based on mismatch bits between the write data and read data read out from the specific region in each memory chip.

12 Claims, 16 Drawing Sheets

(51) Int. Cl.
   *H04L 9/08*     (2006.01)
   *H04L 9/32*     (2006.01)
(52) U.S. Cl.
   CPC .......... *G06F 3/0637* (2013.01); *G06F 3/0688* (2013.01); *G06F 21/73* (2013.01); *H04L 9/0866* (2013.01); *H04L 9/3278* (2013.01)

(56) References Cited

U.S. PATENT DOCUMENTS

| | | |
|---|---|---|
| 2005/0041836 A1 | 2/2005 | Takeda et al. |
| 2006/0212709 A1 | 9/2006 | Kinoshita et al. |
| 2008/0141075 A1* | 6/2008 | Kliewer ............. G11C 29/1201 714/42 |
| 2009/0249014 A1* | 10/2009 | Obereiner ........... G06F 12/1441 711/164 |
| 2011/0252189 A1 | 10/2011 | Kang et al. |
| 2013/0061287 A1 | 3/2013 | Kang et al. |

FOREIGN PATENT DOCUMENTS

| | | |
|---|---|---|
| JP | 2001-7290 | 1/2001 |
| JP | 2004-5941 | 1/2004 |
| JP | 2006-221361 | 8/2006 |

OTHER PUBLICATIONS

Written Opinion of the International Searching Authority issued by the Japanese Patent Office in International Application No. PCT/JP2014/074765, dated Nov. 18, 2014 (3 pages).

\* cited by examiner

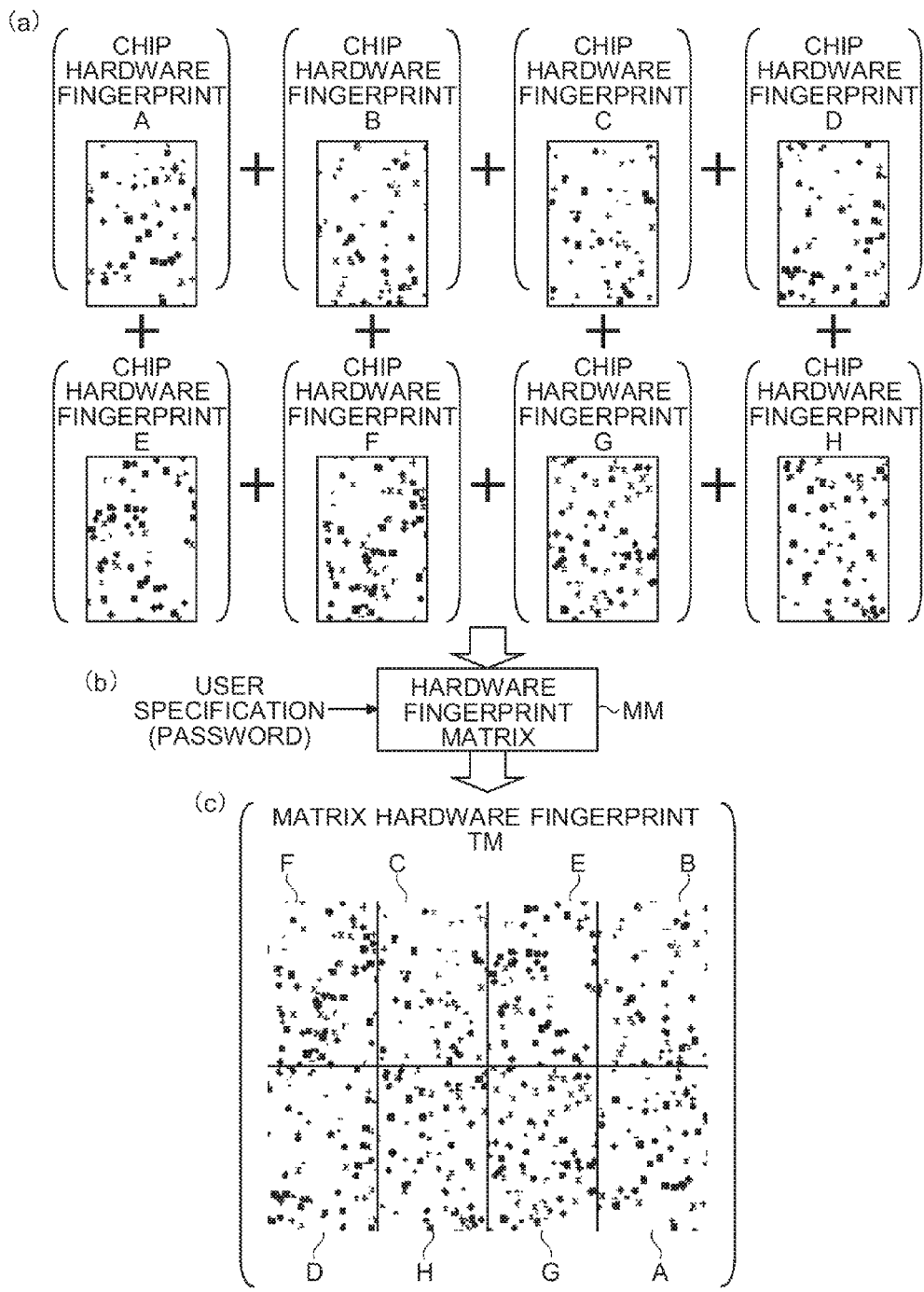

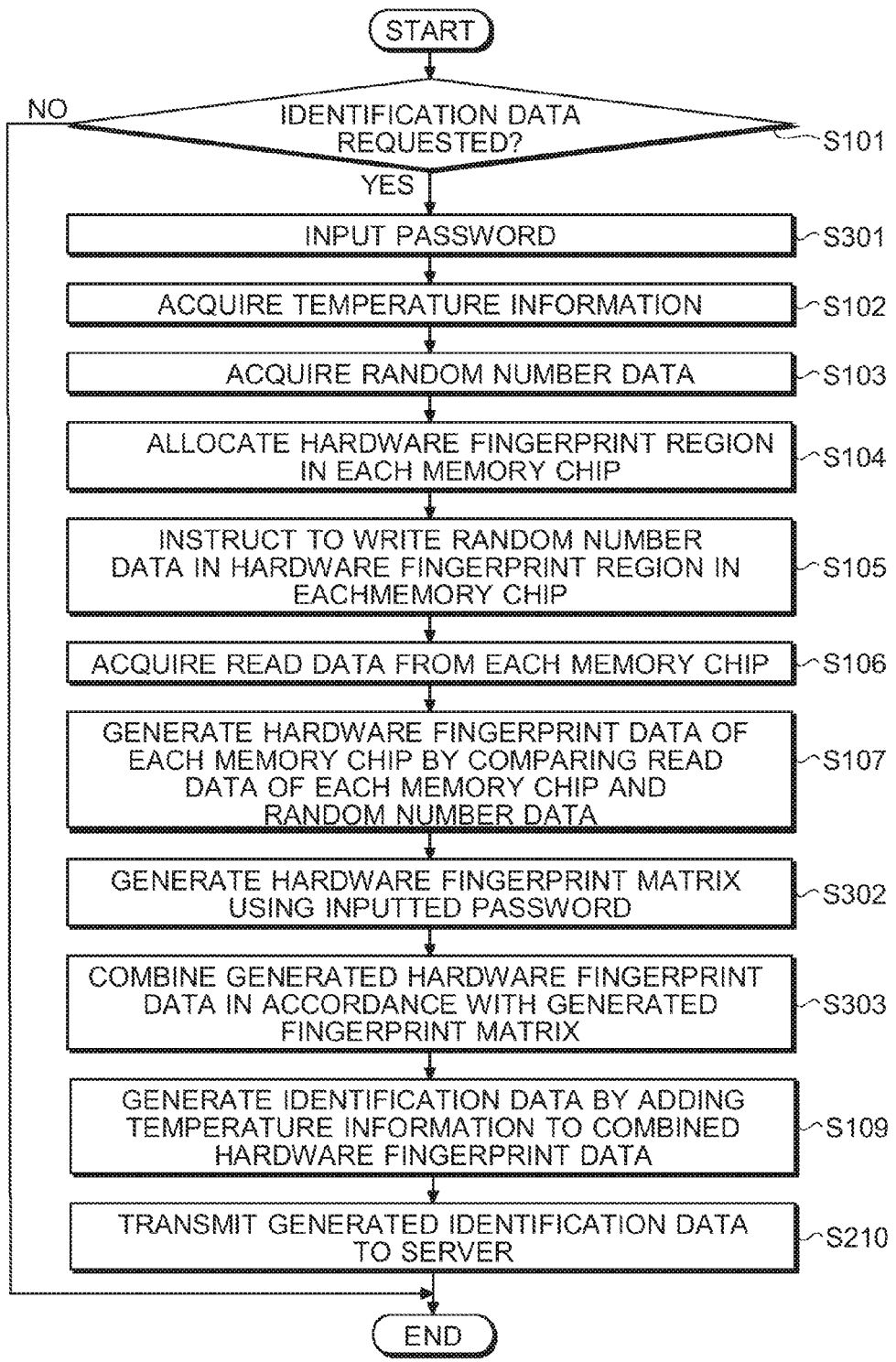

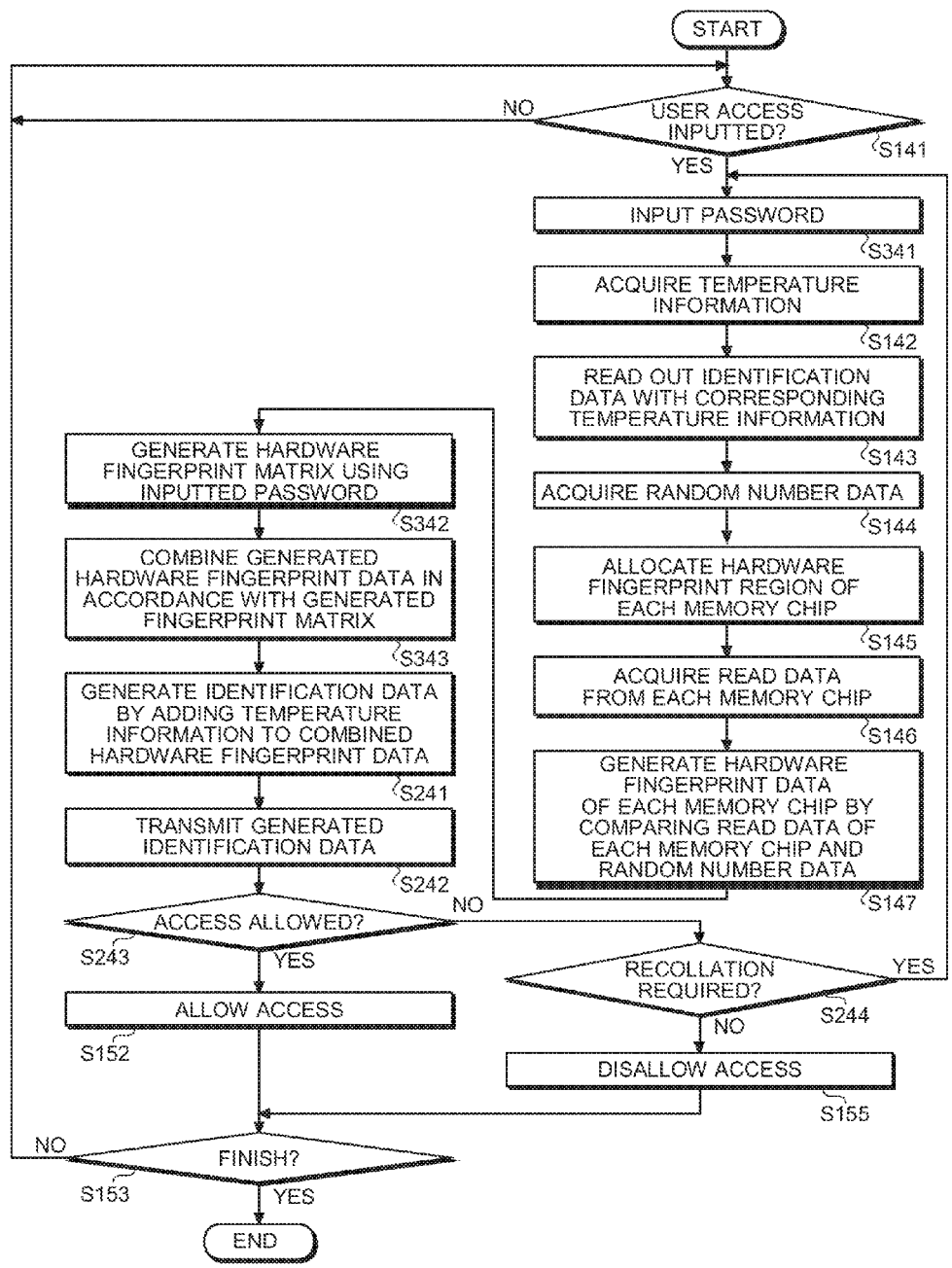

INDIVIDUAL IDENTIFICATION DEVICE, STORAGE DEVICE, INDIVIDUAL IDENTIFICATION SYSTEM, METHOD OF INDIVIDUAL IDENTIFICATION, AND PROGRAM PRODUCT

CROSS-REFERENCE TO RELATED APPLICATIONS

This application is a continuation of PCT international application Ser. No. PCT/JP2014/074765 filed on Sep. 12, 2014, which designates the United States and which claims the benefit of priority from Japanese Patent Application No. 2013-193542, filed on Sep. 18, 2013; the entire contents of which are incorporated herein by reference.

FIELD

Embodiments described herein relate generally to an individual identification device, a storage device, an individual identification system, a method of individual identification, and a program product.

BACKGROUND

Recently, with the miniaturization technique of semiconductor devices, a market of large capacity non-volatile memory systems with levity, fast access and low power consumption has been expanded substantially. Accordingly, from the aspect of security, information management of large capacity memory system is given great importance.

Furthermore, with the miniaturization of non-volatile memories, production variability in characteristics of elements has grown progressively large. Although production variability of non-volatile memories depends on various factors, one of the known factors is a factor that originates from factory-determined processes. Because the process-induced production variability includes random physical features, it is difficult to reproduce memories with the same physical feature.

BRIEF DESCRIPTION OF THE DRAWINGS

FIG. 15 is a schematic diagram showing an example of generation of a matrix hardware fingerprint from a chip hardware fingerprint according to a third embodiment;

FIG. 16 is a flowchart showing an operation example of a superior hardware fingerprint manager at a time of booting according to the third embodiment; and FIG. 17 is a flowchart showing an operation example of a superior hardware fingerprint manager at a time of user access according to the third embodiment.

DETAILED DESCRIPTION

Exemplary embodiments of an individual identification device, a storage device, an individual identification system, a method of individual identification, and a program product will be explained below in detail with reference to the accompanying drawings.

First Embodiment

Firstly, an individual identification device, a storage device, an individual identification system, a method of individual identification, and a program product according to a first embodiment will be described in detail with reference to the accompanying drawings.

In the first embodiment, by using variability of memory fine elements having difficult-to-reproduce physical features, each storage device is identified. In particular, identification information (hereinafter referred to as hardware fingerprint) about each memory chip is generated using process-induced variability of memory elements, and at a time of accessing, by using the hardware fingerprint, an individual is identified with a high degree of accuracy.

As a hardware fingerprint of each memory chip, a 2D distribution of mismatch bits (differences) between random numbers written in each memory chip and random numbers read out from each memory chip in which the random numbers are written is used. Because the process-induced product variability has random physical features, it is difficult to reproduce. Therefore, by using such product variability as a hardware fingerprint for identification, it is possible to realize a high-accuracy individual identification. Furthermore, by combining the product variability with difficult-to-reproduce physical features and random numbers generated in random manner, it is possible to enhance identities of the hardware fingerprints. Accordingly, by using a 2D distribution of mismatch bits between written random numbers and read random numbers as a hardware fingerprint of each memory chip, it is possible to identify a storage device with a higher degree of accuracy.

In the first embodiment, both of individual identification of every storage device and individual identification of each memory chip installed in each storage device are executed. Thereby, it is possible to execute individual identification appropriate to purposes and usages. For example, even if a part of a memory chip in a storage device is replaced, or the like, it is possible to execute individual identification such that the replaced memory chip is disabled while an operation of the whole storage device is maintained.

Figure 1:
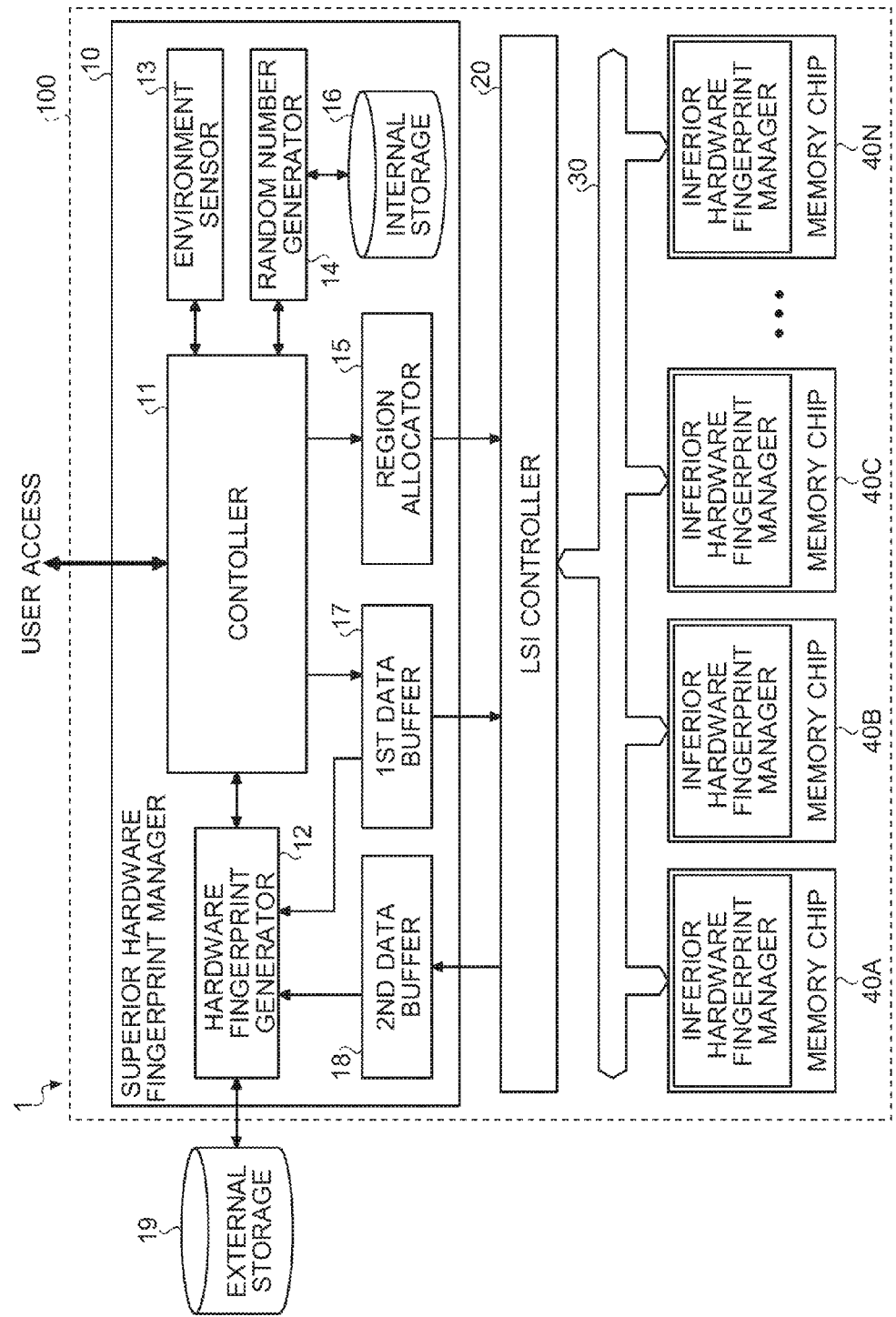
FIG. 1 is a block diagram showing an example of an outline structure of an individual identification device according to a first embodiment.

FIG. 1 is a block diagram showing an example of an outline structure of an individual identification system including a storage device with an individual identification device according to the first embodiment. As shown in FIG. 1, an individual identification system 1 has a storage device 100, and an external storage 19 located outside of the storage device 100. The storage device 100 has a superior hardware fingerprint manager 10, a LSI controller 20, an internal storage 30 and one or more memory chips 40A to 40N. The external storage 19 may be embedded or external with respect to a personal computer, a server, or the like, to be connected to the superior hardware fingerprint manager 10, or may be a storage region located on a network such as the internet, a LAN (local area network), or the like.

The superior hardware fingerprint manager 10 is a structure for executing individual identification of the total storage device 100. The superior hardware fingerprint manager 10 has a controller 11, a hardware fingerprint generator 12, an environment sensor 13, a random number generator 14, a region allocator 15, an internal storage 16, a first data buffer 17 and a second data buffer 18.

The internal storage 16 stores hardware fingerprint data of each of the memory chips 40A to 40N obtained when the storage device 100 is operated under various temperature environments such as 10° C., 20° C., 30° C., 40° C., and so forth. The hardware fingerprint data may be obtained by writing random number data in each of the memory chips 40A to 40N, reading out the random number data from each of the memory chips 40A to 40N, comparing the read data and the random number data used for writing, and mapping mismatch bits two-dimensionally.

The controller 11 can access the external. The external may be a superior device such as a personal computer, a server, or the like, to be connected to the storage device 100. The controller 11 is connected to the hardware fingerprint generator 12, the first data buffer 17, the region allocator 15, the environment sensor 13 and the random number generator 14, and by controlling them, the controller 11 lets the superior hardware fingerprint manager 10 operate.

The environment sensor 13 may be a temperature sensor, for instance. The environment sensor 13 measures an internal temperature of the storage device 100 sequentially. The internal temperature of the storage device 100 may be an internal temperature of a single portion in the whole of the memory chips 40A to 40N, or may be a respective internal temperature of each of the memory chips 40A to 40N. Generally, the internal temperature in the whole of the memory chips 40A to 40N may be nearly equal to the respective internal temperature of each of the memory chips 40A to 40N. In the following, a case where a single portion in the whole of the memory chips 40A to 40N is measured will be explained as an example.

The external storage 19 stores random number data to be used for generating hardware fingerprint data. The random number generator 14 may obtain random number data from the external storage 19 via the controller 11, or may generate random number data oneself.

When a user accesses to the storage device 100, the controller 11 obtains random number data from the random number generator 14, and stores the random number data in the first data buffer 17. At this time, the controller controls the region allocator 15 so that the region allocator 15 accesses a specific memory region (hereinafter referred to as a hardware fingerprint region) in each of the memory chips 40A to 40N. The hardware fingerprint region may be the whole memory region of each of the memory chips 40A to 40N, or may be a part of the memory region of each of the memory chips 40A to 40N. The region allocator 15 writes the random number data stored in the first data buffer 17 in a designed hardware fingerprint region via the LSI controller 20 and the internal bus 30. The LSI controller 20 reads out the random number data from the hardware fingerprint region of each of the memory chips 40A to 40N, and stores these read random number data in the second data buffer 18.

The hardware fingerprint generator 12 generates hardware fingerprint data by comparing the read data stored in the second data buffer 18 and the random number data stored in the first data buffer 17. At this time, the controller 11 inputs temperature information measured by the environment sensor 13 to the hardware fingerprint generator 12. The hardware fingerprint generator 12 generates hardware fingerprint data (hereinafter referred to as identification data) for individual identification by adding the temperature information to the hardware fingerprint data.

The controller 11 executes individual identification of the storage device 100 by comparing the identification data generated by the hardware fingerprint generator 12 and identification data prestored in the internal storage 16. For example, when newly generated identification data matches the identification data stored in the internal storage 16, the controller 11 recognizes the memory chips 40A to 40N connected to the superior hardware fingerprint manager 10 as a proper memory chip array. In such case, the controller 11 can allow the user to access each of the memory chips 40A to 40N. On the other hand, when the newly-generated identification data does not match the identification data stored in the internal storage 16, the controller 11 recognizes as the memory chips 40A to 40N connected to the superior hardware fingerprint manager 10 are an improper memory chip array with some kind of changes. In such case, the controller may disallow the user to access each of the memory chips 40A to 40N.

Figure 2:
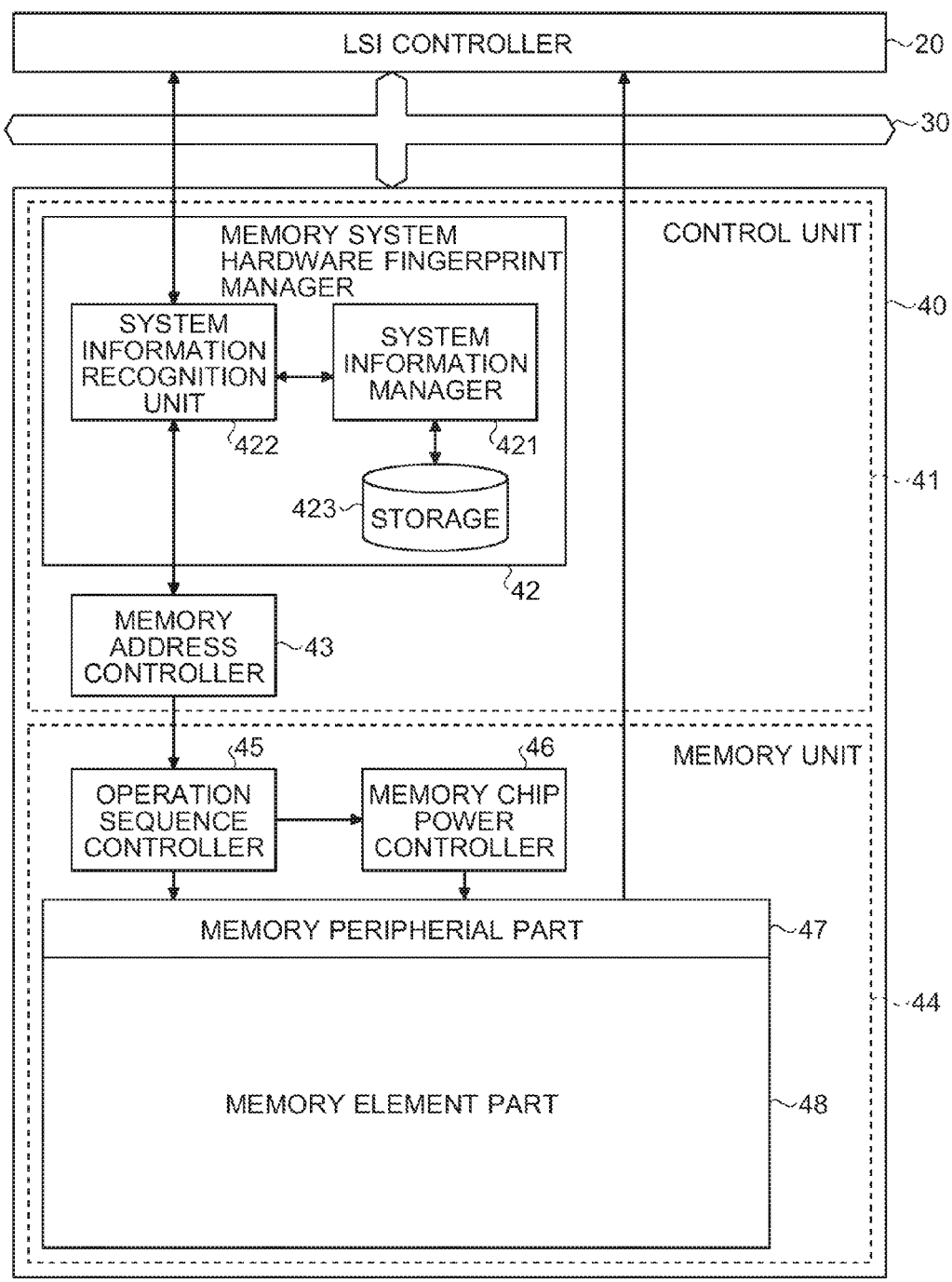
FIG. 2 is a block diagram showing an example of an outline structure of a single piece of memory chip according to the first embodiment.

Next, individual identification of each memory chip will be described. FIG. 2 is a block diagram showing an example of an outline structure of a single piece of memory chip in the individual identification system shown in FIG. 1. In the following, a reference number of any of the memory chips 40A to 40N will be 40.

As shown in FIG. 2, each memory chip 40 mainly has a control unit 41 and a memory unit 44. The control unit 41 includes an inferior hardware fingerprint manager 42 and a memory address controller 43. The memory unit 44 includes an operation sequence controller 4, a memory chip power controller 46, a memory peripheral part 47 and a memory element part 48.

The memory address controller 43 allocates an address (for example, a block number of a hardware fingerprint region, a word line number, a bit line number, or the like) of a memory region accessed via the LSI controller 20. The operation sequence controller 45 controls an operation sequence necessary for operation of the memory element part 48, e.g. write operation, erasure operation, data replication operation, or the like. The memory chip power controller 46 controls a power necessary for operating the memory element part 48.

A storage 434 in the inferior hardware fingerprint manager 42 prestores peripheral chip information, system information, or the like, for instance. The peripheral chip information may include identifiers for identifying the memory chips 40A to 40N connected to a common bus 30 at a time of shipping, manufacturing, or the like (hereinafter referred to as chip IDs), a position of each of the memory chips 40A to 40N (e.g. address, or the like) and access numbers, for instance. The system information may include identification information (hereinafter referred to as a system ID) for identifying the storage device 100, for instance. Each chip ID may be a hardware fingerprint data of each of the memory chips 40A to 40N, or may be an unique information (production number, or the like) assigned to each of the memory chips 40A to 40N. Likewise, the system ID may be a hardware fingerprint data that combines hardware fingerprint data of the memory chips 40A to 40N, or may be an unique information (production number, or the like) assigned to the storage device 100.

The storage 423 may store the random number data used for the generation of the hardware fingerprint data, for instance. However, the hardware fingerprint data is not limited to being stored in the storage 423, and the hardware fingerprint data can be stored in the other storage region such as a part of the memory element part 48, the external storage 19 shown in FIG. 1, or the like.

When access to the memory chip 40 is occurred, a system information manager 421 obtains the peripheral chip information and the system information stored in the storage 423, and transfers these information to a system information recognition unit 422.

When the memory chip 40 is accessed, the system information recognition unit 422 acquires the chip IDs and the positions (addresses, or the like) of the memory chips 40A to 40N connected to the common bus 30 and the system ID of the storage device 100 via the LSI controller 20, and executes individual identification based on whether the acquired information (the chip IDs, the positions and the system ID) matches the peripheral chip information and the system information transferred from the system information manager 421 or not. When these information match, the system information recognition unit 422 recognizes the memory chip 40 including the own system information recognition unit 422 as a proper memory chip managed by the memory information manager 421. On the other hand, when the information mismatch, the system information recognition unit 422 recognizes as the memory chip 40 including the own system information recognition unit 422 is an improper memory chip with some kind of changes. When the memory chip 40 is recognized as a proper memory chip, the system information recognition unit 422 allows access to the memory region via the LSI controller 20, and when the memory chip 40 is recognized as an improper memory chip, the system information recognition unit 422 disallows access to the memory region.

In FIG. 2, as accessing to the memory element part 48 in accordance with commands via the LSI controller 20, firstly, the inferior hardware fingerprint manager 42 reads out data from a region where the random number data is written in the memory element part 48 via the memory address controller 43, and by comparing the read data and the random number data used for writing, the inferior hardware fingerprint manager 42 generates a hardware fingerprint data based on a 2D distribution of mismatch bits.

The generated hardware fingerprint data is transmitted to the superior hardware fingerprint manager 10 via the LSI controller 20. In response to this, as described above, the superior hardware fingerprint manager 10 executes individual identification of the whole storage device 100 using the hardware fingerprint data received from the inferior hardware fingerprint manager 42 of each of the memory chips 40A to 40N. The superior hardware fingerprint manager 10 can also execute individual identification of each of the memory chips 40A to 40N using the hardware fingerprint data received from the inferior hardware fingerprint manager 42 of each of the memory chips 40A to 40N.

Figure 3:
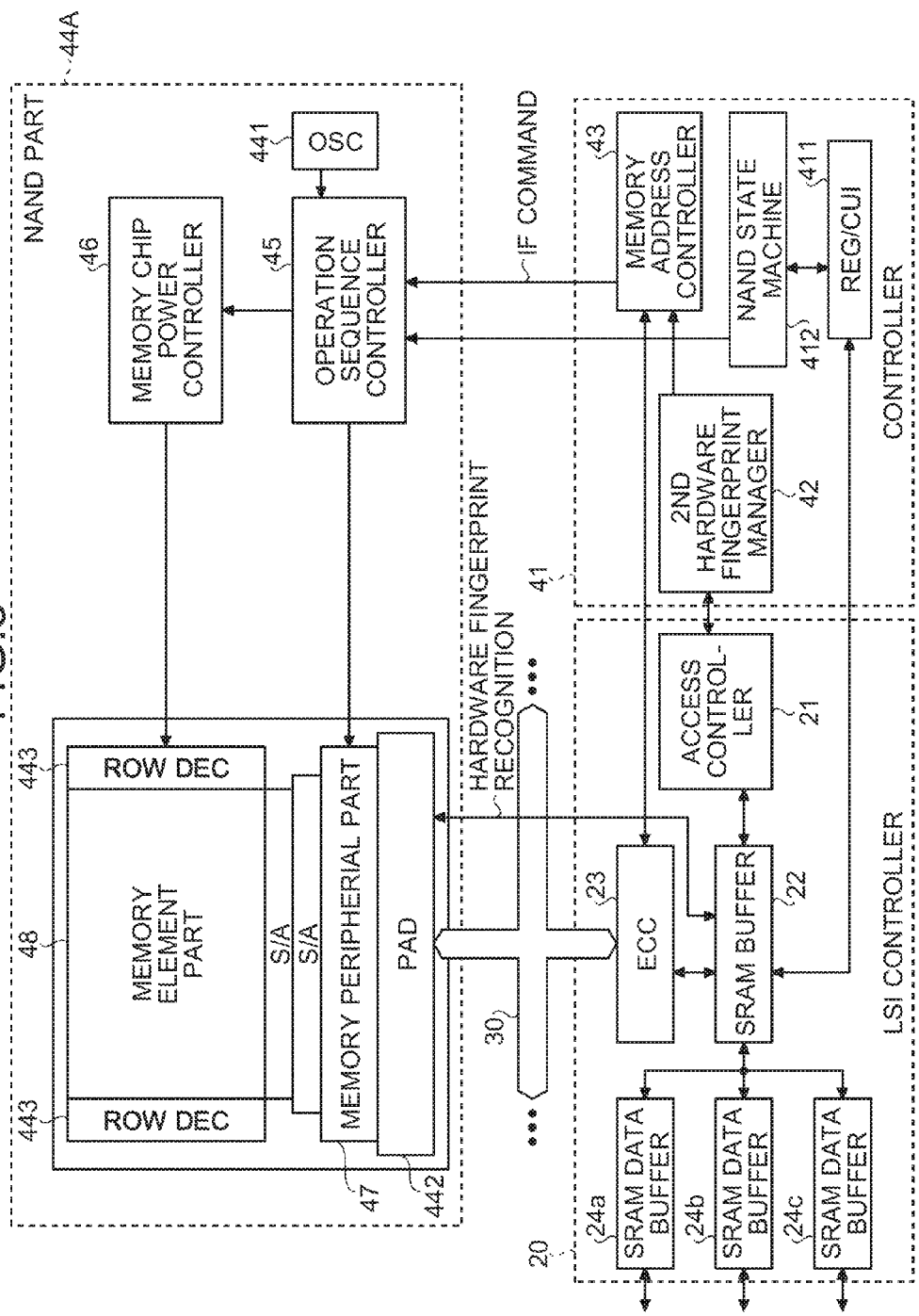
FIG. 3 is a schematic diagram showing a structure example of a non-volatile NAND flash memory chip using the structure shown in FIG. 2.

FIG. 3 shows a structure example of a non-volatile NAND flash memory chip with the structure shown in FIG. 2. As shown in FIG. 3, the non-volatile NAND flash memory chip has a controller unit 41, a NAND part 44. The controller 41 and the NAND part 44A are connected to the LSI controller 20 via the bus 30 or a leased line.

The controller 41 has, in addition to the inferior hardware fingerprint manager 42 and the memory address controller 43, a REG/CUI 411 and a NAND state machine 412 as basic configurations thereof. The NAND part 44A corresponds to the memory unit 44 in FIG. 2, and has an oscillator 441 generating clock signal being an operation reference, a pad 442 for connecting to the bus 30, and row decoders 443 for decoding an address of accessed memory region in addition to the operation sequence controller 45, the memory chip power controller 46, the memory peripheral part 47 and the memory element part 48. The LSI controller 20 connected to the non-volatile NAND flash memory chip via the bus 30 has an access controller 21, an SRAM buffer 2, an ECC (error check and control) 23, and a plurality of SRAM data buffers 24a to 24c.

Here, the structure of the non-volatile NAND flash memory chip shown in FIG. 3 is a just random example, and an arrangement of the units are not limited to the layout shown in FIG. 3.

Figure 4:
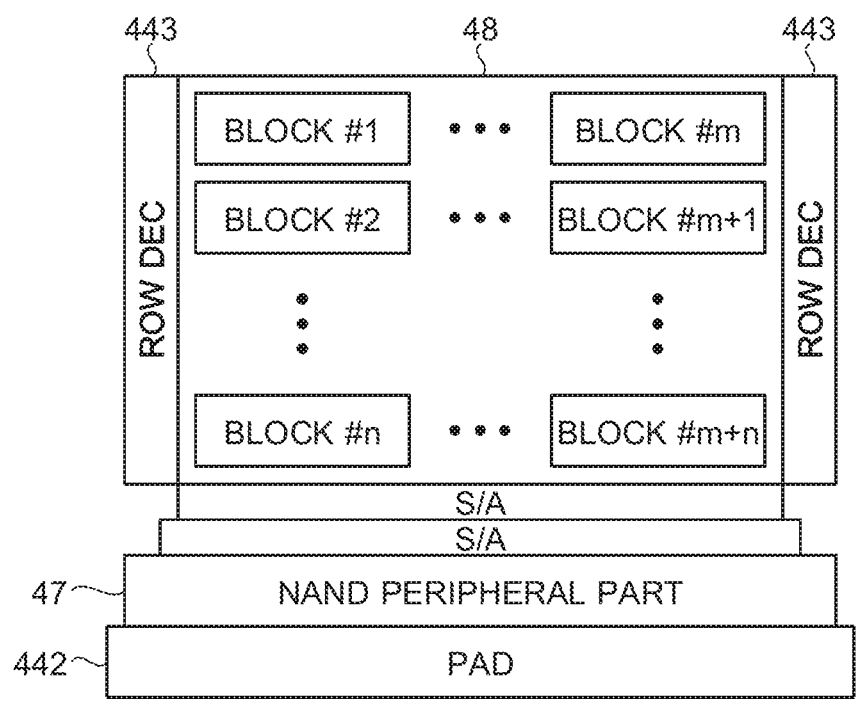
FIG. 4 is a schematic diagram showing an example of blocks of a memory element part of the non-volatile NAND flash memory shown in FIG. 3.

FIG. 4 shows an example of blocks of the memory element part of the non-volatile NAND flash memory chip. As shown in FIG. 4, one memory element part 48 includes a plurality of blocks #1 to #m+n. A part of the blocks #1 to #m+n (for example, a block #1) may be used as a hardware fingerprint region for generation of hardware fingerprint data. A memory region constructed from a plurality of bits connected to a specific word line or a specific bit line in one or more blocks can also be used as the hardware fingerprint region.

Figure 5:
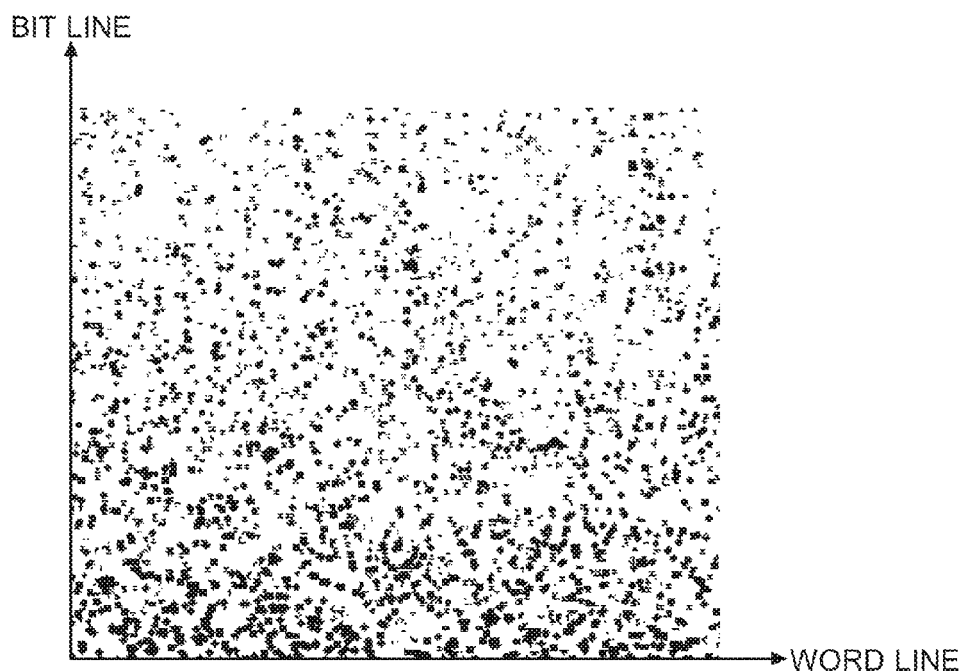
FIG. 5 is a distribution map showing an example of a 2D distribution of mismatch bits in first read data in a case where random numbers are written in a specific memory region of a memory chip.

Next, the hardware fingerprint data in the first embodiment will be described in detail with reference to the accompanying drawings. FIG. 5 is a distribution map showing an example of a 2D distribution of mismatch bits between write data (random number) and first read data in a case where random numbers are written in a specific memory region of a memory chip. In FIG. 5, a horizontal axis shows a direction of word lines in a cell array, and a vertical axis shows a direction of bit lines in the cell array. FIG. 5 shows a case where the random number is written in multilevel mode.

Here, a mismatch bit is not limited to a bad bit. For example, a mismatch bit in the first embodiment may be a bit such that a read value under binary mode corresponds to a written value but a read value under multilevel mode (e.g. 8-bit mode) does not match the written value. In such case, when mismatch bits are few, for instance, in order to increase the mismatch bits, memory elements may be deteriorated by repeating write and erasure operations for certain times.

The random number data used for generation of hardware fingerprint data may be generated in the storage device 100 or each of the memory chips 40A to 40N, or may be generated by a server, a personal computer, or the like, connected to the storage device 100 via a specific network. When the random number data is generated in the storage device 100 or each of the memory chips 40A to 40N, the 2D distribution (hardware fingerprint data) of mismatch bits can be generated in the storage device 100 or each of the memory chips 40A to 40N. On the other hand, when the random number data is generated by a server, or the like, the read data should be transmitted to the server, or the like, and the server, or the like, will generate the 2D distribution of mismatch bits.

Figure 6:
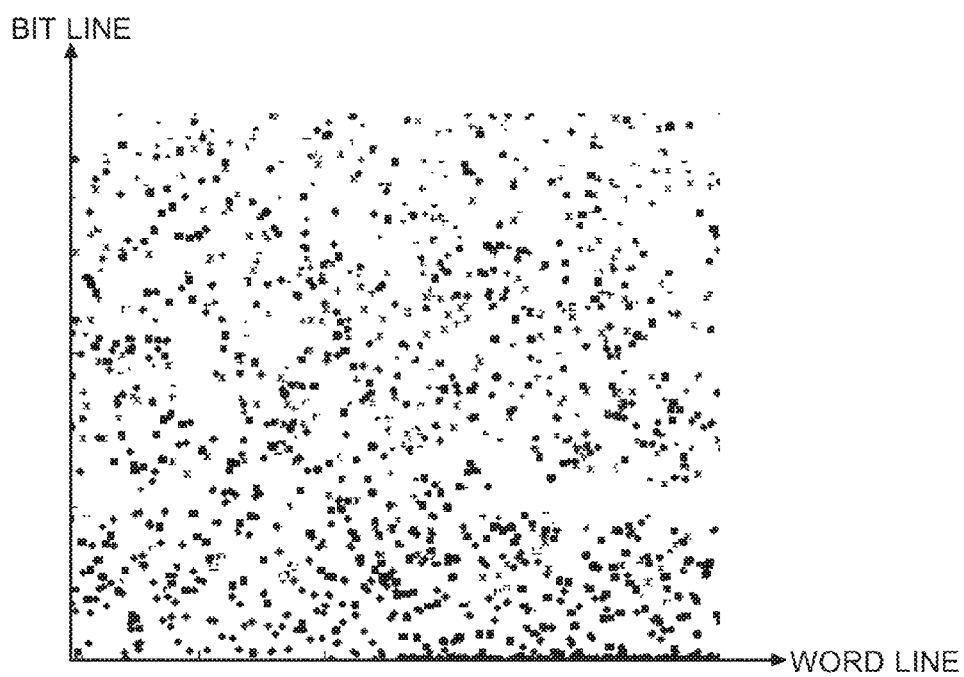
FIG. 6 is a distribution map showing an example of a 2D distribution of mismatch bits in all of the first, third and one-hundredth read data in a case where random numbers are written in the specific memory region of the memory chip.

FIG. 6 is a distribution map showing an example of a 2D distribution of mismatch bits in all of the first, third and one-hundredth read data in a case where random numbers are written in the specific memory region of the memory chip. In this way, mismatch bits which are found mismatched in the most part of the repetitions of write/readout/erasure are reproducible mismatch bits. For example, in the example shown in FIG. 6, a reproducibility of mismatch bits in a case where readout was repeated for a hundred times is equal to or more than 99%. Therefore, by extracting such reproducible mismatch bits and defining the reproducible mismatch bits as the hardware fingerprint data of the memory chips 40, it is possible to generate more reliable hardware fingerprint data. In actual use, write of random number data may be once being initial. Thereby, it is possible to reduce the element deterioration caused by repetitions of write/readout/erasure.

Figure 7:
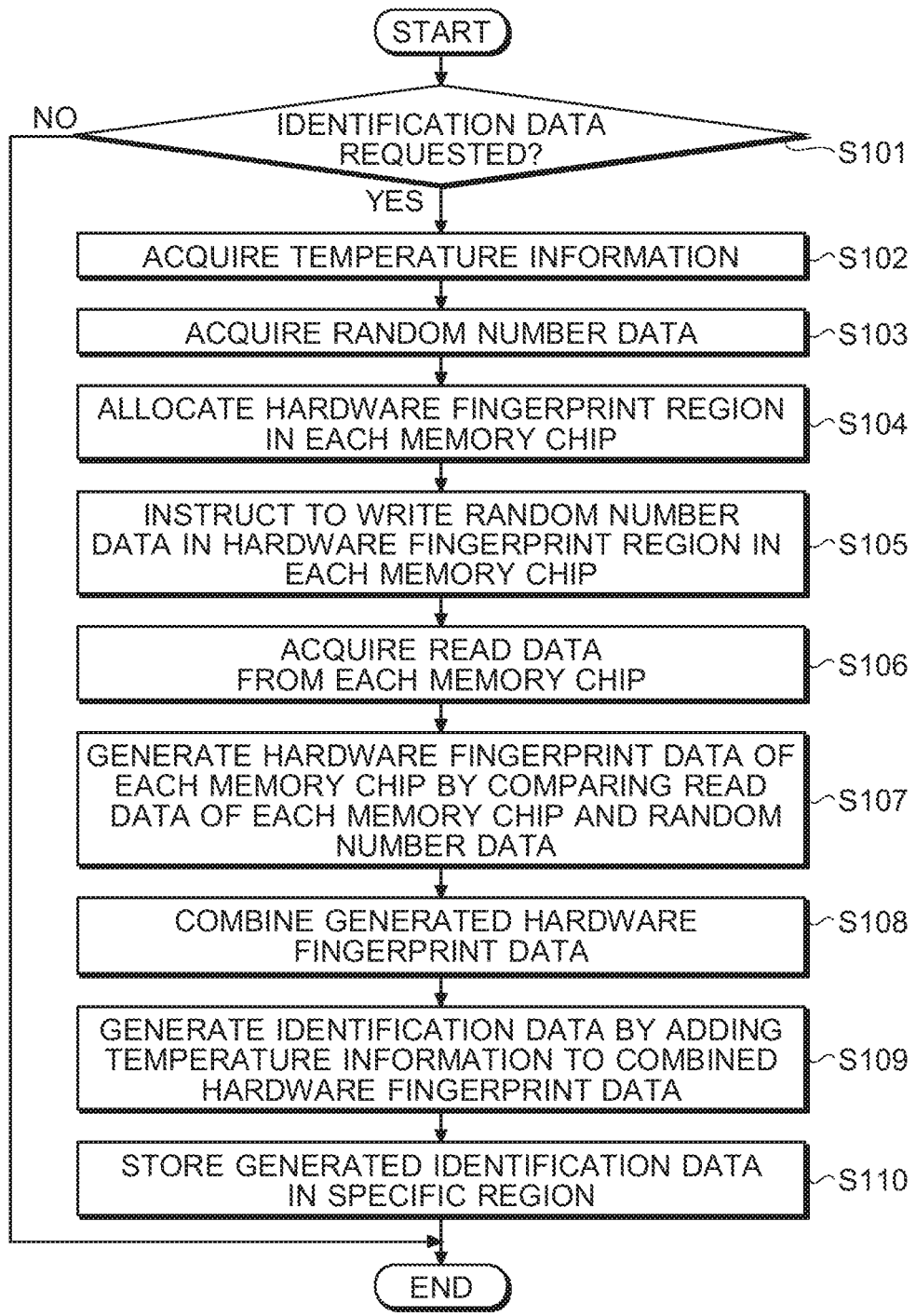
FIG. 7 is a flowchart showing an operation example of a superior hardware fingerprint manager at a time of booting according to the first embodiment.

Next, an operation of the storage device 100 according to the first embodiment will be described in detail with reference to the accompanying drawings. FIG. 7 is a flowchart showing an operation example of a superior hardware fingerprint manager at a time of booting according to the first embodiment. As shown in FIG. 7, the controller 11, after booting, firstly, determines whether generation of identification data is necessary or not (step S101). Whether the generation of identification data is necessary or not may be determined by the controller 11 based on information such as whether booting is initial booting after initialization, whether necessary identification data (identification data corresponding to a current temperature, for instance) is stored in the internal storage 16 or not, or the like. When the generation of identification data is necessary (step S101; YES), the controller 11 progresses to step S102, and when the generation of identification data is not necessary (step S101; NO), the controller 11 directly finishes the operation.

In step S102, the controller 11 acquires information about a current temperature from the environment sensor 13. In addition, in step S102, until a temperature of the storage device 100 is stabilized, the controller 11 may wait the acquisition of the temperature information from the environment sensor 13.

Then, the controller acquires random number data from the random number generator 14, and stores the acquired random number data in the first data buffer 17 (step S103). As described above, the random number generator 14 may acquire the random number data from the external storage 19 via the controller 11, or may generate the random number data oneself.

Then, the controller 11 allocates a memory region to be used as a hardware fingerprint region in each of the memory chips 40A to 40N (step S104). Then, the controller 11 writes the random number data stored in the first data buffer 17 in the allocated hardware fingerprint region via the region allocator 16 (step S105).

Then, the controller 11 instructs the hardware fingerprint generator 12 to read out the random number data written in the hardware fingerprint region in each of the memory chips 40A to 40N (step S106). The read data are temporarily stored in the second data buffer 18.

Then, the controller 11 instructs the hardware fingerprint generator 12 to generate hardware fingerprint data of each of the memory chips 40A to 40N by comparing the random number data stored in the first data buffer 17 and the read data of each of the memory chips 40A to 40N stored in the second data buffer 18 (step S107).

Then, the controller 11 generates hardware fingerprint data of the whole storage device 100 by combining the hardware fingerprint data of the memory chips 40A to 40N generated by the hardware fingerprint generator 12 in accordance with a specific layout (step S108). As the specific layout, various kinds of layout such as a layout corresponding to an actual layout of the two-dimensional-arrayed memory chips 40A to 40N, or the like, for instance, can be applied.

Then, the controller 11 generates identification data by adding temperature information acquired from the environment sensor 13 in step S102 to the generated hardware fingerprint data of the whole storage device 100 (step S109). After that, the controller 11 stores the generated identification data in the external storage 19 or the internal storage 16 (step S110), for instance, and finishes the operation.

Figure 8:
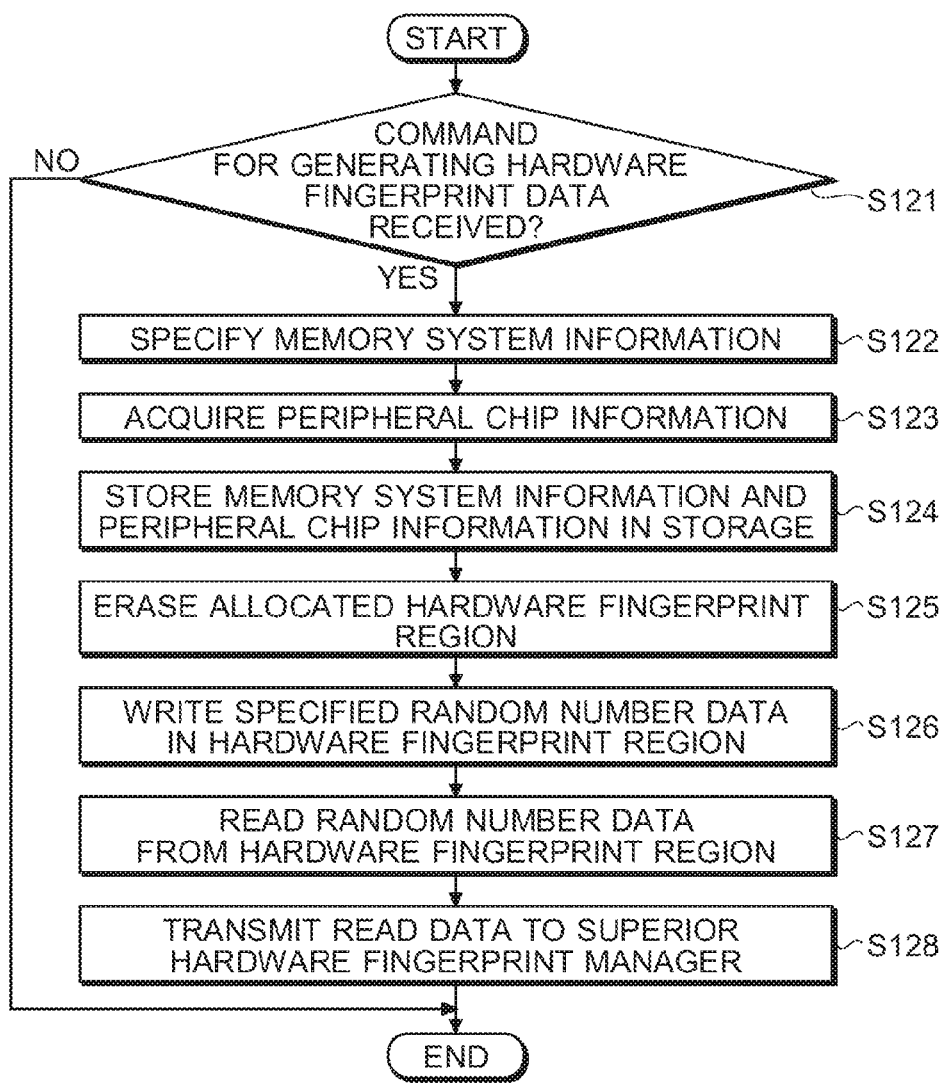
FIG. 8 is a flowchart showing an operation example of an inferior hardware fingerprint manager at the time of booting according to the first embodiment.
Figure 10:
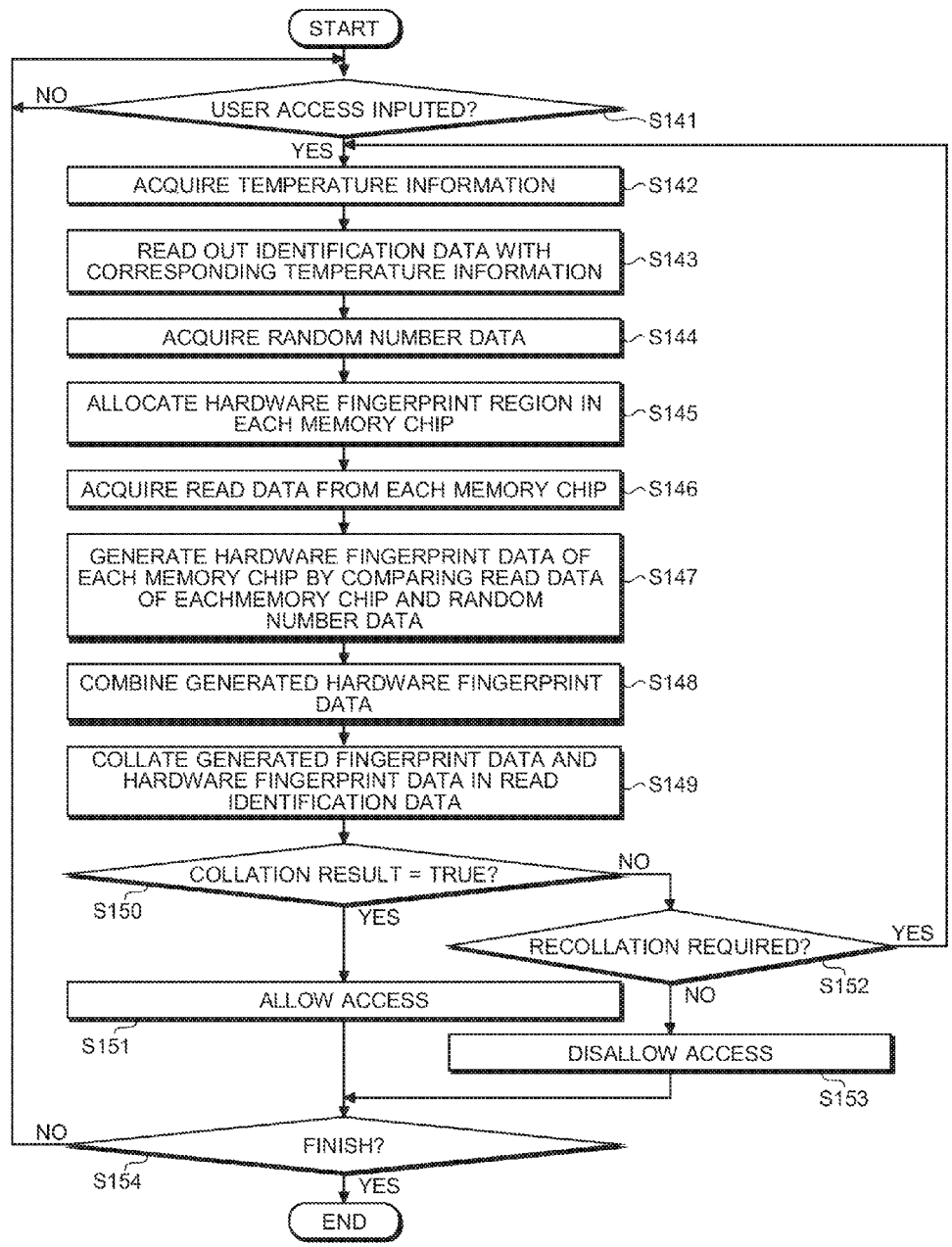
FIG. 10 is a flowchart showing an operation example of the superior hardware fingerprint manager at a time of user access according to the first embodiment.

In response to the operation of the superior hardware fingerprint manager 10 shown in FIG. 10, the inferior hardware fingerprint manager 42 of each of the memory chips 40A to 40N operates as shown in FIG. 8, for instance. That is, the inferior hardware fingerprint manager 42, after booting, determines whether an instruction for generating hardware fingerprint data (hereinafter referred to as hardware fingerprint generation instruction) is received from the superior hardware fingerprint manager 10 via the LSI controller 20 or not (step S121). When the hardware fingerprint generation instruction is not received (step S121; NO), the inferior hardware fingerprint manager 42 directly finishes the operation.

On the other hand, when the hardware fingerprint generation instruction is received (step S121; YES), the inferior hardware fingerprint manager 42 specifies system information included in the hardware fingerprint generation instruction (step S122). Furthermore, the inferior hardware fingerprint manager 42 acquires peripheral chip information about the memory chips 40A to 40N connected to the common bus 30 (step S123). Then, the inferior hardware fingerprint manager 42 stores the specified system information and the peripheral chip information in the storage 423 (step S124).

Then, the inferior hardware fingerprint manager 42 erases the hardware fingerprint region allocated by the hardware fingerprint generation instruction (step S125), and writes the random number data noticed with the hardware fingerprint generation instruction in the hardware fingerprint region (step S126).

Then, the inferior hardware fingerprint manager 42 reads out the written random number data from the hardware fingerprint region (step S127). After that, the inferior hardware fingerprint manager 42 transmits the read hardware fingerprint data to the superior hardware fingerprint manager 10 as read data (step S128), and finishes the operation. In addition, the inferior hardware fingerprint manager 42 can obtain hardware fingerprint data of the own memory chip generated by the superior hardware fingerprint manager 10, and store the data in the storage 423.

Here, the hardware fingerprint data generated for each of the memory chips 40A to 40N and the hardware fingerprint data generated for the whole storage device 100 will be explained with reference to the accompanying drawings. In the following, for distinguishing the hardware fingerprint data generated for each of the memory chips 40A to 40N and the hardware fingerprint data generated for the whole storage device 100, the hardware fingerprint data generated for each of the memory chips 40A to 40N will be referred to as chip hardware fingerprint, and the hardware fingerprint data generated for the whole storage device 100 will be referred to as matrix hardware fingerprint.

Figure 9:
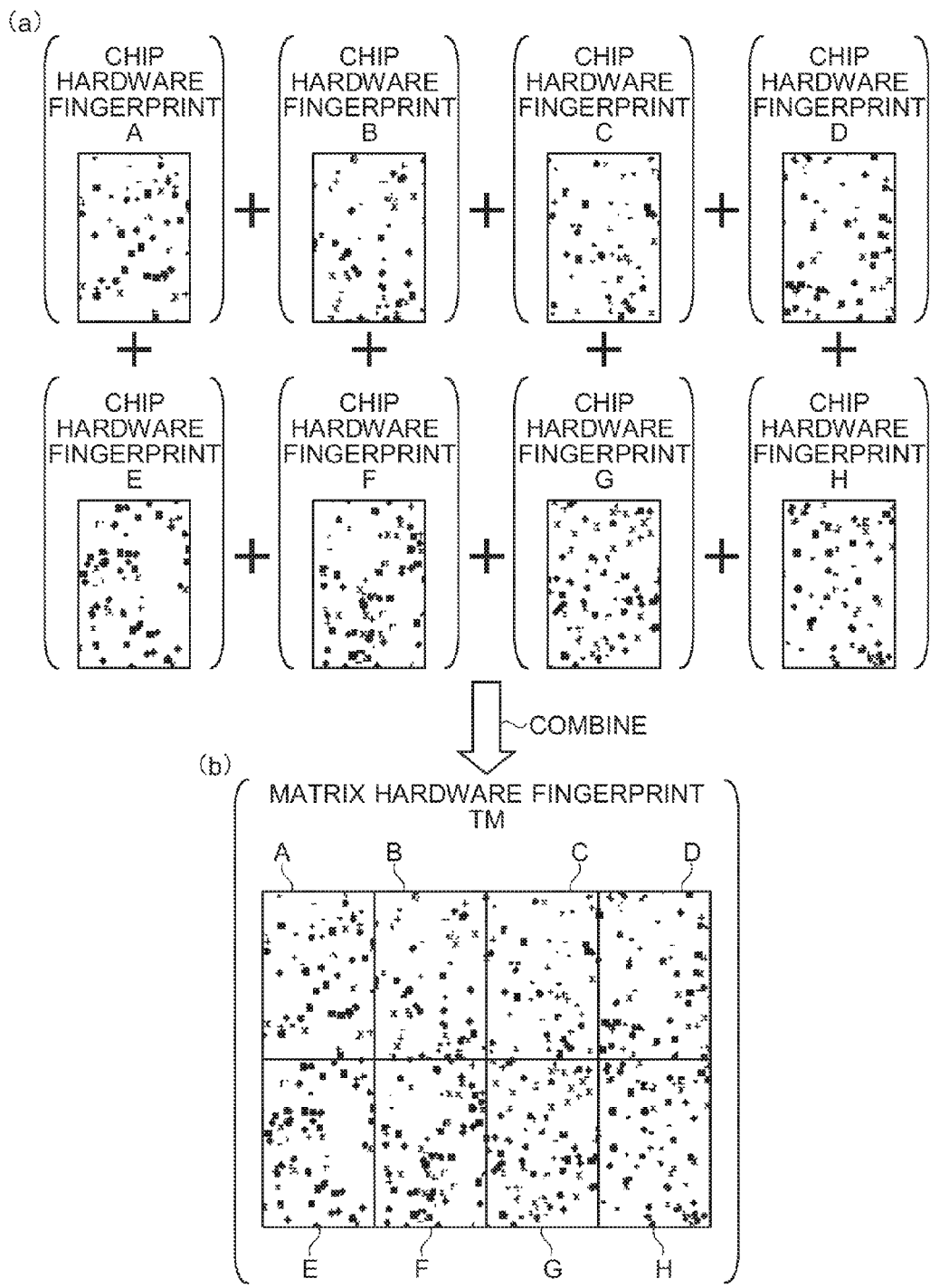
FIG. 9 is a schematic diagram showing an example of generation of a matrix hardware fingerprint from a chip hardware fingerprint according to the first embodiment.

FIG. 9 is a schematic diagram showing an example of generation of a matrix hardware fingerprint from a chip hardware fingerprint according to the first embodiment. When the storage device 100 has eight memory chips A to H as the memory chips 40, and when these memory chips A to H are arranged on the bus 30 in a 2-by-4 matrix, for instance, the hardware fingerprint generator 12 in the superior hardware fingerprint manager 10 generates eight chip hardware fingerprints A to H as shown in (a) of FIG. 9. The generated eight chip hardware fingerprints A to H are combined with each other according to a layout of the memory chips A to H as shown in (b) of FIG. 9. Thereby, a matrix hardware fingerprint TM1 for the storage device 100 is generated. Here, the generated matrix hardware fingerprint is not limited to two-dimensional data as shown in FIG. 9(b), and a one-dimensional line data is also possible. For example, it is possible to arrange such that the user can select which kind of data is to be used.

Next, an operation of the controller 11 in the superior hardware fingerprint manager 10 at a time of user access will be explained using FIG. 10. As shown in FIG. 10, the controller 11 waits till user access occurred (step S141; NO), and when user access occurs (step S141; YES), firstly, the controller 11 acquires current temperature information from the environment sensor 13 (step S142), and acquires identification data corresponding to the acquired temperature information from the external storage 19 or the internal storage 16 (step S143).

Then, the controller 11 acquires random number data from the random number generator 14, and stores the acquired random number data in the first data buffer 17 (step S144). The acquired random number data is random number data used for the generation of the hardware fingerprint data. The random number data may be stored in the external storage 19, or may be stored in the internal storage 16.

Then, the controller 11 specifies a hardware fingerprint region of each of the memory chips 40A to 40N (step S145), and instructs the region allocator 15 to acquire read data from the specified hardware fingerprint region of each of the memory chips 40A to 40N (step S146). The read data are temporarily stored in the second data buffer 18.

Then, the controller 11 instructs the hardware fingerprint generator 12 to generate hardware fingerprint data of each of the memory chips 40A to 40N by comparing the random number data stored in the first data buffer 17 and the read data of each of the memory chips 40A to 40N stored in the second data buffer 18 (step S147).

Then, the controller 11 generates hardware fingerprint data of the whole storage device 100 by combining the hardware fingerprint data of the memory chips 40A to 40N generated by the hardware fingerprint generator 12 in accordance with a specific layout (step S148). As the specific layout, as in step S108 of FIG. 7, various kinds of layout such as a layout corresponding to an actual layout of the two-dimensional-arrayed memory chips 40A to 40N, or the like, for instance, can be applied.

Then, the controller 11 collates the generated hardware fingerprint data of the whole storage device 100 and hardware fingerprint data in the identification data read out in step S143 (step S149). Then, the controller 11 determines whether the generated hardware fingerprint data of the whole storage device 100 matches the hardware fingerprint data in the identification data (step S150), and when these hardware fingerprint data match (step S150; YES), the controller 11 allows access to the memory chips 40A to 40N from the user (step S151), and progresses to step S154). Here, the allowance of access to the memory chips 40A to 40N which has been issued may be continued until power for the storage device 100 is cut. Furthermore, the allowance of access to the memory chips 40A to 40N may be issued for each user.

On the other hand, when the generated hardware fingerprint data of the whole storage device 100 does not match to the hardware fingerprint data in the identification data (step S150; NO), the controller 11 determines whether recollation of hardware fingerprint data is necessary or not (step S152). Whether the recollation is necessary or not may be determined based on how many times the collation is, stability of temperature, or the like. When the recollation is necessary (step S152; YES), the controller 11 returns to step S142, and executes the following steps again. On the other hand, when the recollation is not necessary (step S152; NO), the controller 11 disallows access to the memory chips 40A to 40N from the user (step S153), and progresses to step S154. Here, the disallowance of access to the memory chips 40A to 40N which has been issued may be continued until power for the storage device 100 is cut. Furthermore, the disallowance of access to the memory chips 40A to 40N may be issued for each user.

After that, the controller 11 determines whether the operation is finished or not (step S154), and when the operation is not finished (step S154; NO), the controller 11 returns to step S141, and when the operation is finished (step S154; YES), the controller 11 finishes the operation.

Figure 11:
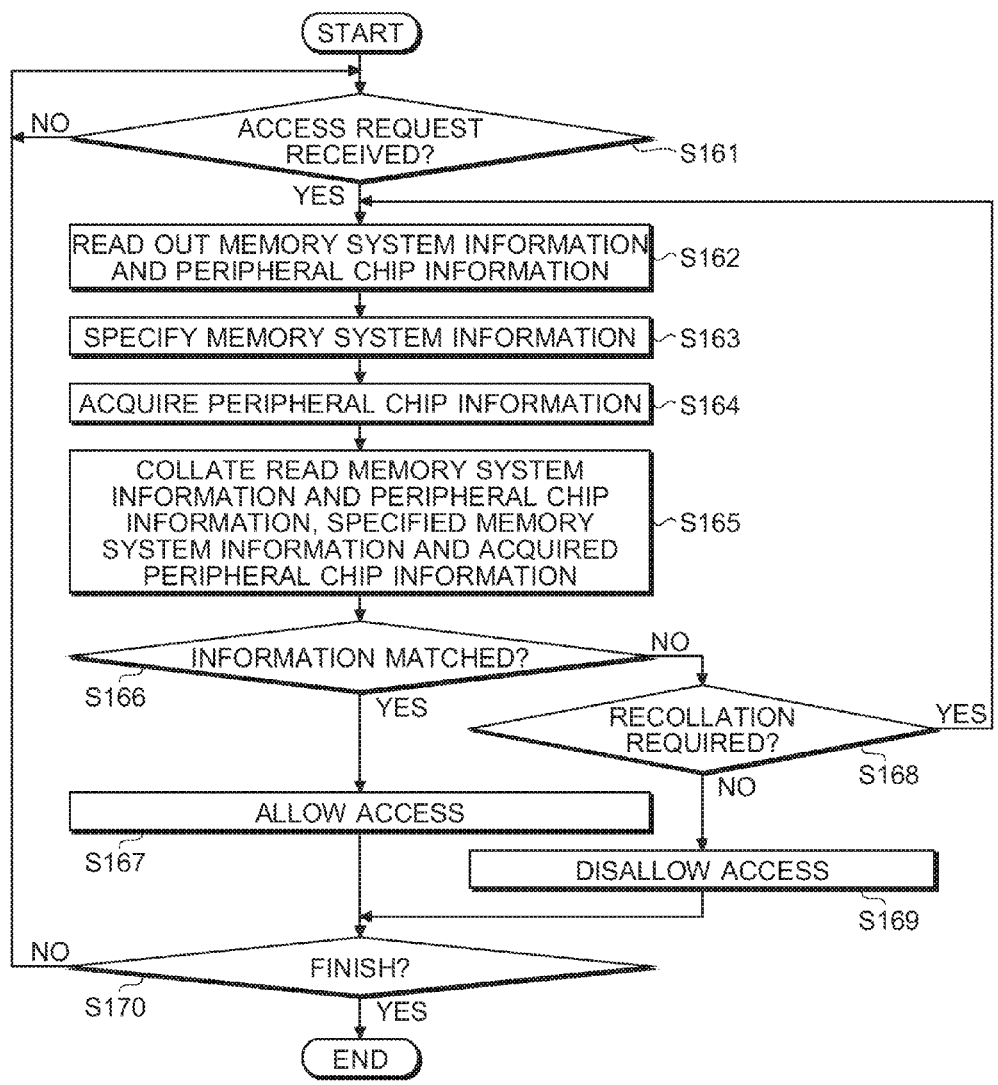
FIG. 11 is a flowchart showing an operation example of the inferior hardware fingerprint manager at the time of user access according to the first embodiment.

The inferior hardware fingerprint managers 10 of the memory chips 40A to 40N which are received access request from the superior hardware fingerprint manager 10 may execute individual identification as shown in FIG. 11 individually. That is, as shown in FIG. 11, the inferior hardware fingerprint manager 42 waits till an access request is received from the superior hardware fingerprint manager 10 (step S161; NO), and when the access request is received (step S161; YES), the inferior hardware fingerprint manager 42 reads out the system information and the peripheral chip information from the storage 423 (step S162).

Then, the inferior hardware fingerprint manager 42 specifies system information included in the access request (step S163), and acquires peripheral chip information about the memory chips 40A to 40N connected to the common bus 30 (step S164).

Then, the inferior hardware fingerprint manager 42 collates the system information specified from the access request and the system information read out from the storage 423, and the acquired peripheral chip information and the peripheral chip information read out from the storage 423 (step S165). Then, the inferior hardware fingerprint manager 42 determines whether these information match or not (step S166), and when these information match (step S16; YES), the inferior hardware fingerprint manager 42 allows access to the own memory chip (step S167), and progresses to step S170. Here, the allowance of access which has been issued for each chip may be continued until power for the storage device 100 is cut. Furthermore, this allowance may be issued for each user.

On the other hand, when the system information specified from the access request and the acquired peripheral chip information mismatch the system information read out from the storage 423 and the peripheral chip information read out from the storage 423 (step S166; NO), the inferior hardware fingerprint manager 42 determines whether recollation of these information is necessary or not (step S168). Whether the recollation is necessary or not may be determined based on how many times the collation is, stability of temperature, or the like. When the recollation is necessary (step S168; YES), the inferior hardware fingerprint manager 42 returns to step S162, and executes the following steps again. On the other hand, when the recollation is not necessary (step S168; NO), the inferior hardware fingerprint manager 42 disallows access to the own memory chip (step S169), and progresses to step S170. Here, the disallowance of access which has been issued for each chip may be continued until power for the storage device 100 is cut. Furthermore, this disallowance may be issued for each user.

After that, the inferior hardware fingerprint manager 42 determines whether the operation is finished or not (step S170), and when the operation is not finished (step S170; NO), the inferior hardware fingerprint manager 42 returns to step S161, and when the operation is finished (step S170; YES), the inferior hardware fingerprint manager 42 finishes the operation.

In addition, when the recollation is determined as necessary in step S168 (step S168; YES), except for returning to step S162 and executing the steps that follow as described above, a procedure where a security passcode is prepared and an input of the security passcode is required, or the like, can be considered. Furthermore, on the assumption that a memory chip gets stolen, it is possible to automatically erase the user data stored in the memory chips to which access is disallowed, or to set the controller 41 to a disable state.

As described above, in the first embodiment, by using process-induced variability of a memory chip, a distribution of mismatch bits between write data (random number data) and read data is used as hardware fingerprint data (chip hardware fingerprint) of the memory chip. Furthermore, in the first embodiment, hardware fingerprint data (matrix hardware fingerprint) of the whole storage device 100 is generated based on a layout of a plurality of memory chips, or the like. Thus, because it is possible to generate difficult-to-reproduce data for identification (hardware fingerprint data) by using production variability having difficult-to-reproduce physical features, it is possible to realize a higher-accuracy individual identification. Moreover, by using the individual identification as security hardware fingerprints for the whole storage device 100 and/or each memory chip, it is possible to realize a security system with higher security.

For example, when a part of the memory chips 40A to 40N gets stolen, the matrix hardware fingerprint generated at a time of user access will not match to an initial matrix hardware fingerprint. In such case, based on a command from a server, a determination in the superior hardware fingerprint manager 10, or a determination in the inferior hardware fingerprint manager 42, it is possible to disallow usage of the whole storage device 100 or the memory chips which may have been stolen, erase data in the whole storage device 100 or the memory chips which may have been stolen, or the like.

Furthermore, when a part of the memory chips 40A to 40N gets stolen, the peripheral chip information in each memory chip 40 also mismatches initial peripheral information. In such case, based on a command from a server, a determination in the superior hardware fingerprint manager 10, or a determination in the inferior hardware fingerprint manager 42, it is possible to disallow usage of the whole storage device 100 or the memory chips which may have been stolen, erase data in the whole storage device 100 or the memory chips which may have been stolen, or the like.

Moreover, in the first embodiment, the environment sensor 13 such as a temperature sensor is mounted, and hardware fingerprint data depending on a detection result of the environment sensor 13 is generated. Therefore, even if generated hardware fingerprint data depends on environment such as temperature, it is possible to generated hardware fingerprint data depending on the environment, and thereby, it is possible to realize a higher-accuracy individual identification.

Moreover, in the first embodiment, a part of a memory region in each of the memory chips 40A to 40N is used as the hardware fingerprint region. In such case, because repetition of comparatively-high frequency writing in the hardware fingerprint region, or the like, does not occur, it is possible to reduce the effect of device degradation. As a result, it is possible to realize individual identification with higher reproducibility.

Second Embodiment

Next, an individual identification device, a storage device, an individual identification system, a method of individual identification, and a program product according to a second embodiment will be described in detail with reference to the accompanying drawings.

Although individual identification is executed in the superior hardware fingerprint manager 10 in the second embodiment, the individual identification can also be executed out of a storage device such as on a server on a network, for instance. In the second embodiment, a caser where individual identification is executed on a server on a network is described as an example.

A storage device according to the second embodiment may have the same structure as that of the storage device 100 exampled in the first embodiment. However, in the second embodiment, the superior hardware fingerprint manager 10 in the storage device can communicate with a server via a network such as the internet, a LAN (local area network), or the like.

Figure 12:
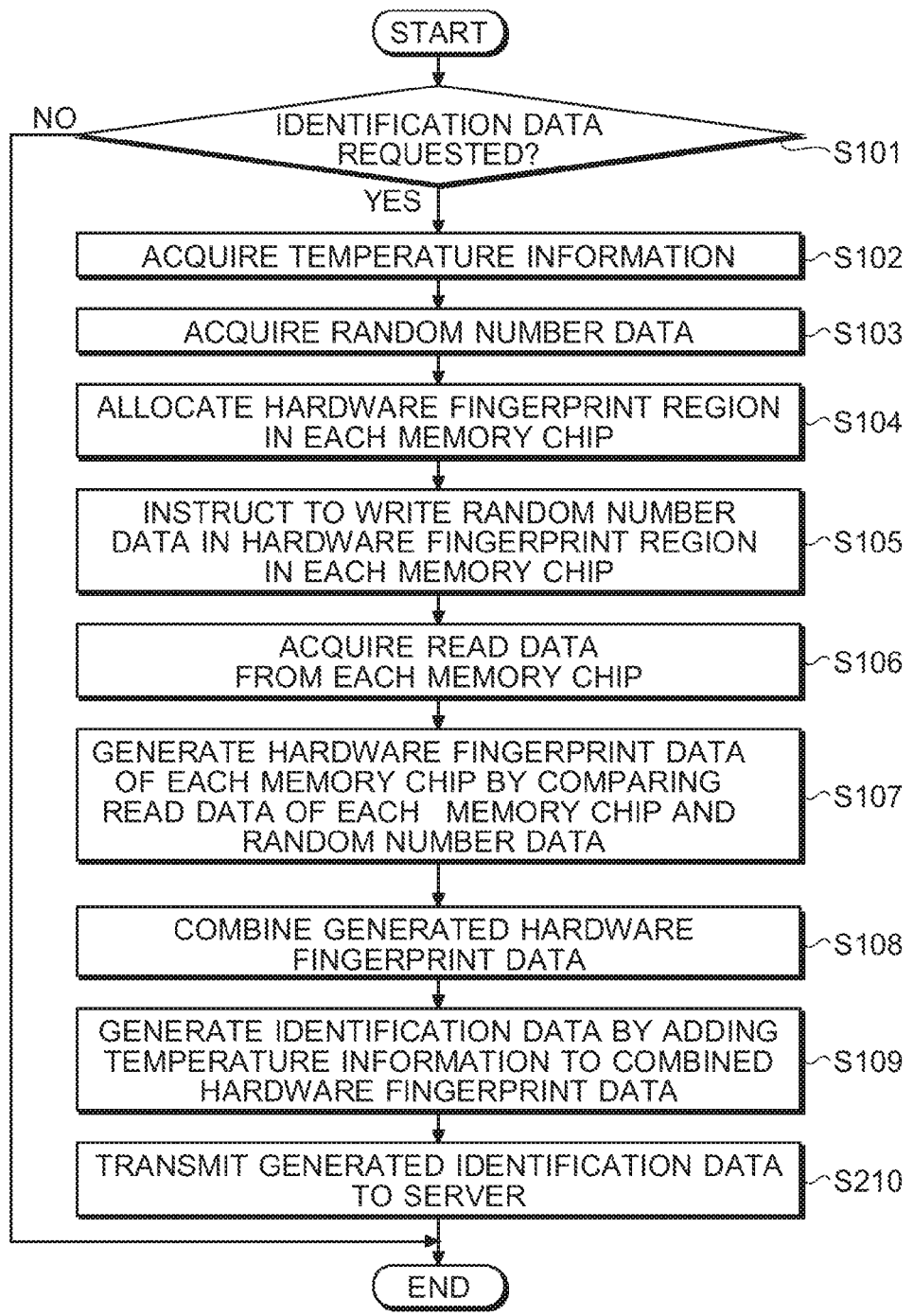
FIG. 12 is a flowchart showing an operation example of a superior hardware fingerprint manager at a time of booting according to a second embodiment.

Next, an operation of the storage device according to the second embodiment will be described in detail with reference to the accompanying drawings. FIG. 12 is a flowchart showing an operation example of the controller 11 of the superior hardware fingerprint manager 10 in the storage device at a time of booting. In FIG. 12, as for the same steps as those in FIG. 7, the same reference numbers will be assigned, and the redundant explanations thereof will be omitted. Furthermore, because the operations explained using FIG. 8 in the first embodiment are the same in the second embodiment, the redundant explanations thereof will be omitted.

As shown in FIG. 12, the controller 11, after booting, generates the identification data by executing the same operations as steps S101 to S109 in FIG. 7. Then, the controller 11 transmits the generated identification data to a server via a network (step S210), and then, finishes the operation. In response to this, the server stores the received identification data in a specific storage region (the external storage 19, for instance).

Figure 13:
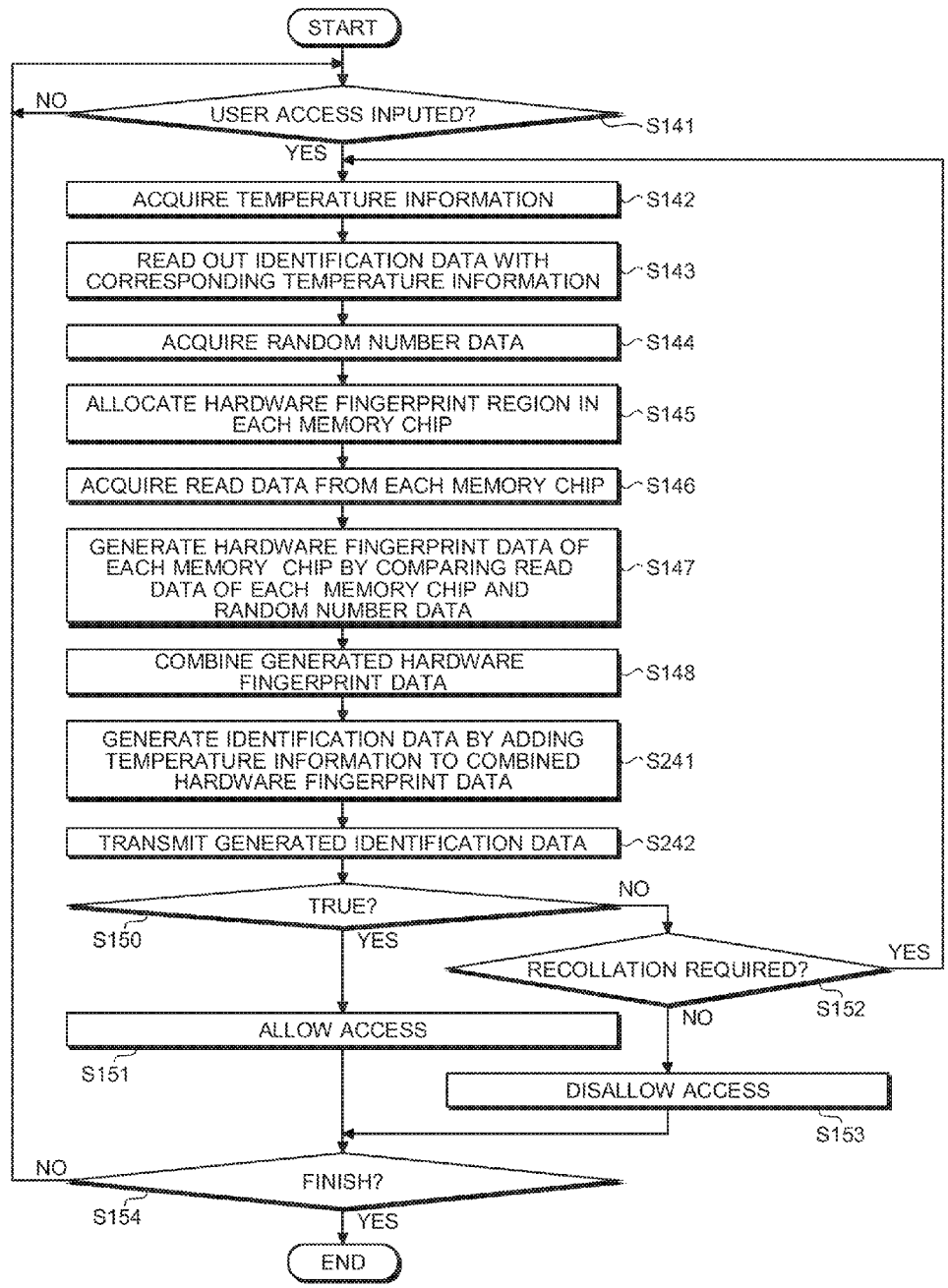
FIG. 13 is a flowchart showing an operation example of a superior hardware fingerprint manager at a time of user access according to the second embodiment.

Next, an operation at a time of user access in the second embodiment will be described using FIG. 13. FIG. 13 is a flowchart showing an example of an operation at a time of user access according to the second embodiment. In FIG. 13, as for the same steps as those in FIG. 10, the same reference numbers will be assigned, and the redundant explanations thereof will be omitted. Furthermore, because the operations explained using FIG. 11 in the first embodiment are the same in the second embodiment, the redundant explanations thereof will be omitted.

As shown in FIG. 13, by executing the same operations as steps S141 to S148 in FIG. 10, the controller 11 combines the hardware fingerprint data generated for the memory chips 40A to 40N. Then, the controller 11 generates identification data by adding temperature information acquired from the environment sensor 13 in step S142 to the generated hardware fingerprint data of the whole storage device 100 (step S241), and transmits the identification data to the server via a network (step S242). In response to this, the server determines whether the received identification data and identification data stored in a specific storage device (the external storage 19, for instance) match or not by collating these identification data. The determination result thereof is transmitted to the storage device 100, and is inputted in the controller 11.

After that, when the controller 11 receives the collation result from the server, the controller 11 determines whether the collation result is true or not, i.e., determines whether these identification data under the same temperature information match or not (step S243), and when the collation result is true (step S243; YES), as the step S141 in FIG. 10, the controller 11 allows access to the memory chips 40A to 40N from the user (step S151), and progresses to step S154. Here, the allowance of access to the memory chips 40A to 40N which has been issued may be continued until power for the storage device 100 is cut. The allowance of access to the memory chips 40A to 40N may be issued for each user.

On the other hand, when the collation result is false (step S243; NO), as step S152 in FIG. 10, the controller 11 determines whether recollation of hardware fingerprint data is necessary or not, and when the recollation is necessary (step S152; YES), the controller 11 returns to step S142, and when the recollation is not necessary (step S152; NO), the controller 11 disallows access to the memory chips 40A to 40N from the user (step S153), and progresses to step S154. Here, the disallowance of access to the memory chips 40A to 40N which has been issued may be continued until power for the storage device 100 is cut. Furthermore, the disallowance of access to the memory chips 40A to 40N may be issued for each user.

After that, the controller 11 determines whether the operation is finished or not (step S154), and when the operation is not finished (step S154; NO), the controller 11 returns to step S141, and when the operation is finished (step S154; YES), the controller 11 finishes the operation.

As described above, according to the second embodiment, it is possible to execute the individual identification of the storage device and/or each memory chip on the server side with higher accuracy. Accordingly, also in a distributed memory 400 being a large non-volatile memory (a large SSD memory for server, for instance) with a plurality of the memory chips 40A to 40N as shown in FIG. 14, for instance, it is possible to realize a higher-accuracy individual identification and a security system with the higher-accuracy individual identification.

Figure 14:
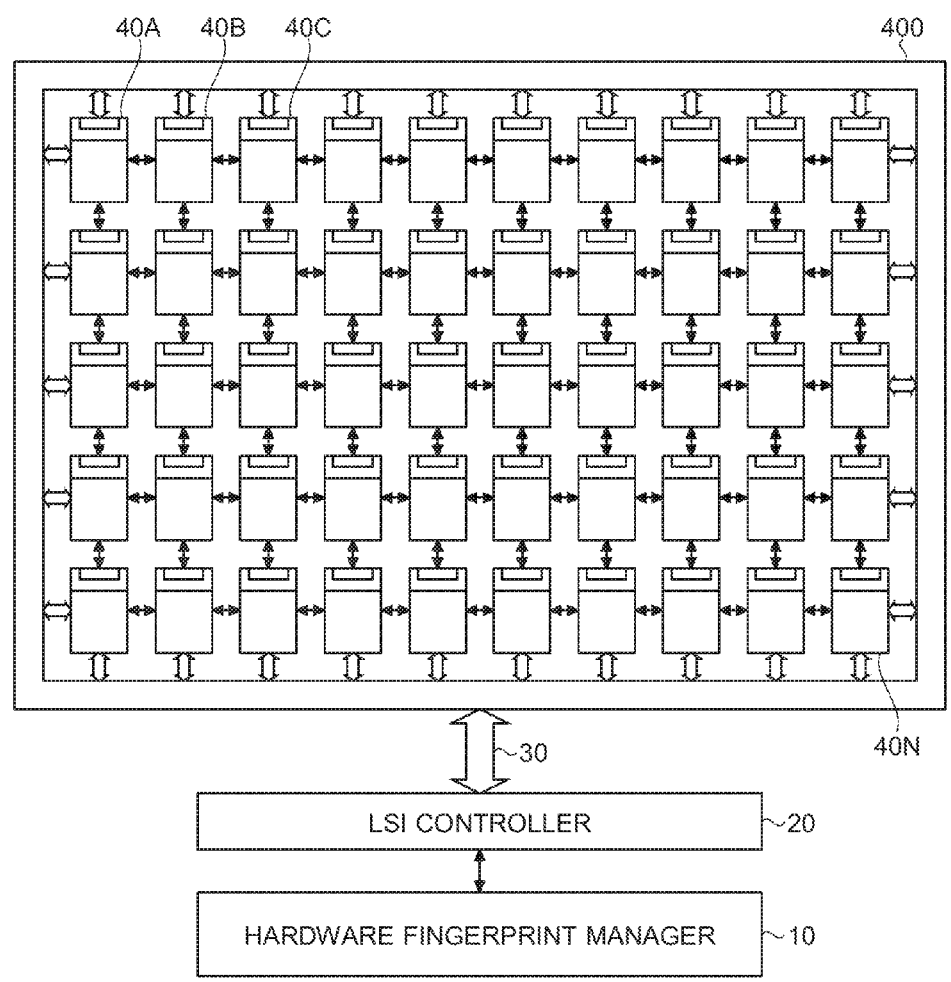
FIG. 14 is a block diagram showing an example of a distributed memory according to the second embodiment.

For example, in the distributed memory 400 shown in FIG. 14, the superior hardware fingerprint manager 10 manages identification data of all of the memory chips 40A to 40N. Therefore, when a certain memory chip 40 cannot be confirmed, information about the certain memory chip 40 is transmitted to the server and recorded. After that, when a user (suspicious user, for instance) accesses to the certain memory chip 40, information about unconfirmed chip is noticed to a superior hardware fingerprint manager 10 of the certain memory chip 40. When the superior hardware fingerprint manager 10 determines that an access target is an unconfirmed chip based on the information about unconfirmed chip, the superior hardware fingerprint manager 10 automatically disallows access to the corresponding memory chip. At this time, the superior hardware fingerprint manager 10 may erase data in the corresponding chip.

Because the other structures, operations and effects can be the same with the above-described embodiment, the redundant explanations thereof will be omitted.

Third Embodiment

Next, an individual identification device, a storage device, an individual identification system, a method of individual identification, and a program product according to a third embodiment will be described in detail with reference to the accompanying drawings.

In the above-described embodiments, the chip hardware fingerprints generated for the memory chips 40A to 40N are combined in accordance with a fixed assembly layout such as the actual layout of the two-dimensionally arrayed memory chips 40A to 40N. On the other hand, in the third embodiment, a parameter for deciding an assembly layout of chip hardware fingerprints is added, and by using the added parameter, the assembly layout of chip hardware fingerprint is made individually different by each storage device. As the parameter, unique information by each storage device or each user such as a password designated by the user, a production number of a storage device, or the like, for instance, can be applied.

FIG. 15 is a schematic diagram showing an example of generation of a matrix hardware fingerprint from a chip hardware fingerprint according to the third embodiment. When the storage device 100 has eight memory chips A to H as the memory chips 40, and when these memory chips A to H are arranged on the bus 30 in a 2-by-4 matrix, for instance, the hardware fingerprint generator 12 in the superior hardware fingerprint manager 10 generates eight chip hardware fingerprints A to H as shown in (a) of FIG. 15. The generated eight chip hardware fingerprints A to H are combined with each other according to an assembly layout (hereinafter referred to as hardware fingerprint matrix MM) generated using a password designed by the user, for instance, as shown in (b) of FIG. 15. Thereby, as shown in (c) of FIG. 15, a matrix hardware fingerprint TM2 in which the chip hardware fingerprints A to H are combined in a layout different by each storage device 100 or each user.

Next, a structure and an operation of the storage device according to the third embodiment will be described. The storage device according to the third embodiment may have the same structure as that of the storage device 100 examined in the first embodiment. However, in the third embodiment, the information (here, password designed by user) used for generation of hardware fingerprint matrix MM or the hardware fingerprint matrix MM generated using the information is stored in one of the external storage 19, the internal storage 16 and storage 423.

The password designed by the user can be used not only for generation of the hardware fingerprint matrix MM as described above, but used as a parameter for deciding which block in each memory chip 40 or which region (word line or bit line, for instance) in each block is to be used as a hardware fingerprint region.

Next, an operation of the storage device according to the third embodiment will be described in detail. FIG. 16 is a flowchart showing an operation example of a superior hardware fingerprint manager at a time of booting according to the third embodiment. In the third embodiment, although an operation based on the operation according to the second embodiment will be explained as an example, the operation according to the first embodiment can also be used as a basis of the operation. In FIG. 16, as for the same steps as those in FIG. 12, the same reference numbers will be assigned, and the redundant explanations thereof will be omitted. Furthermore, because the operations explained using FIG. 8 in the first embodiment are the same in the third embodiment, the redundant explanations thereof will be omitted.

As shown in FIG. 16, the controller 11, after booting, as step S101 in FIG. 12, determines whether generation of identification data is necessary or not, and when the generation is necessary (step S101; YES), the controller 11 progresses to step S301, and when the generation is not necessary (step S101; NO), the controller 11 directly finishes the operation.

In step S301, the controller 11 inputs a password from the user. The user may input the password to an superior device connected to the storage device, or may directly input the password to the storage device.

Then, the controller 11, by executing the same operations as steps S102 to S107 in FIG. 12, generates hardware fingerprint data of each of the memory chips 40A to 40N.

Then, the controller 11 generates a hardware fingerprint matrix MM using the password inputted at step S301 (step S302), and by combining the hardware fingerprint data of the memory chips 40A to 40N in accordance with the generated hardware fingerprint matrix MM, the controller 11 generates hardware fingerprint data of the whole storage device 100 (step S303).

Then, the controller 11 generates the identification data by adding temperature information to the generated hardware fingerprint data as steps S109 and S210 in FIG. 12, transmits the identification data to the server, and finishes the operation. In response to this, the server stores the received identification data in a specific storage region (the external storage 19, for instance).

Next, an operation at a time of user access according to the third embodiment will be explained using FIG. 17. FIG. 17 is a flowchart showing an operation example of a superior hardware fingerprint manager at a time of user access according to the third embodiment. In FIG. 17, as for the same steps as those in FIG. 13, the same reference numbers will be assigned, and the redundant explanations thereof will be omitted. Furthermore, because the operations explained using FIG. 11 in the first embodiment are the same in the third embodiment, the redundant explanations thereof will be omitted.

As shown in FIG. 17, the controller 11 waits till user access occurred as step S141 in FIG. 13 (step S141; NO), and when user access occurred (step S141; YES), the controller 11 inputs a password from the user (step S341). In step S341, as step S301 in FIG. 16, the user may input the password to an superior device connected to the storage device, or may directly input the password to the storage device.

Then, the controller 11 generates the hardware fingerprint data of each of the memory chips 40A to 40N by executing the same operations as steps S142 to S147 in FIG. 13.

Then, the controller 11 generates a hardware fingerprint matrix MM using the password inputted at step S341 (step S342), and by combining the hardware fingerprint data of the memory chips 40A to 40N in accordance with the generated hardware fingerprint matrix MM, the controller 11 generates hardware fingerprint data of the whole storage device 100 (step S343).

After that, the controller 11, by executing the same operations as steps S241 to S242 and S150 to S153 in FIG. 13, allows or disallows access to the memory chips 40A to 40N based on the collation result in the server. When the recollation is determined as necessary in step S153 of FIG. 17, the controller 11 may input a password that is different from the password previously inputted at step S341.

As described above, in the third embodiment, because the parameter for generating the matrix hardware fingerprint TM is added, it is possible to realize a higher-accuracy individual identification. Moreover, by using the individual identification as security hardware fingerprints for the whole storage device and/or each memory chip, it is possible to realize a security system with higher security.

Because the other structures, operations and effects can be the same with the above-described embodiment, the redundant explanations thereof will be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An individual identification device for identifying a storage device including one or more memory chips, the individual identification device comprising:
    a first storage configured to store write data;
    a region allocator configured to write the write data in a specific region in each memory chip;
    a hardware fingerprint generator configured to generate first hardware fingerprint data based on mismatch bits between the write data and read data read out from the specific region in each memory chip;
    a second storage configured to store the first hardware fingerprint data;
    a controller configured to identify the storage device by collating second hardware fingerprint data, which is generated by the hardware fingerprint generator using read data read out from the specific region and the write data, and the first hardware fingerprint data stored in the second storage; and
    an environment sensor configured to acquire temperature information of the storage device,
    wherein the controller is further configured to make the hardware fingerprint allocator store the temperature information in the second storage while the temperature information is associated with the first hardware fingerprint data, and when the hardware fingerprint generator generates the second hardware fingerprint data using the read data read out from the specific region and the write data, collate the first hardware fingerprint data, which is associated with temperature information acquired by the environment sensor, and the second hardware fingerprint data.

2. The device according to claim 1, wherein the controller is further configured to, when the second hardware fingerprint data and the first hardware fingerprint data mismatch, disallow access to the storage device or the memory chips.

3. The device according to claim 2, wherein the second storage is an external storage located outside of the storage device.

4. The device according to claim 1, wherein the controller is further configured to, when the second hardware fingerprint data and the first hardware fingerprint data mismatch, erase data stored in the storage device or the memory chips.

5. The device according to claim 1, further comprising a random number generator configured to generate the write data being a random number.

6. The device according to claim 1, wherein each of the memory chips is a NAND flash memory chip.

7. A memory system including one or more memory chips, the memory system comprising the individual identification device according to claim 1.

8. An individual identification device for identifying a storage device including memory chips, the individual identification device comprising:
a first storage configured to store write data;
a region allocator configured to write the write data in a specific region in each memory chip; and
a hardware fingerprint generator configured to generate first hardware fingerprint data based on mismatch bits between the write data and read data read out from the specific region in each memory chip, wherein
the first hardware fingerprint data includes third hardware fingerprint data being unique by each memory chip and fourth hardware fingerprint data being unique for the storage device, and
the hardware fingerprint generator is further configured to generate the third hardware fingerprint data for each memory chip based on the mismatch bits between the write data and the read data read out from the specific region in each memory chip, and generate the fourth hardware fingerprint data by combining the third hardware fingerprint data of the memory chips in accordance with a specific layout.

9. The device according to claim 8, further comprising a controller configured to generate the specific layout based on a specific password.

10. An individual identification system for identifying a storage device including one or more memory chips, the system comprising:
an individual identification device, wherein the individual identification device includes
a first storage configured to store write data;
a region allocator configured to write the write data in a specific region in each memory chip;
a hardware fingerprint generator configured to generate first hardware fingerprint data based on mismatch bits between the write data and read data read out from the specific region in each memory chip;
a second storage configured to store the first hardware fingerprint data;
a controller configured to identify the storage device by collating second hardware fingerprint data, which is generated by the hardware fingerprint generator using read data read out from the specific region and the write data, and the first hardware fingerprint data stored in the second storage; and
an environment sensor configured to acquire temperature information of the storage device,
wherein the controller is further configured to make the hardware fingerprint allocator store the temperature information in the second storage while the temperature information is associated with the first hardware fingerprint data, and when the hardware fingerprint generator generates the second hardware fingerprint data using the read data read out from the specific region and the write data, collate the first hardware fingerprint data, which is associated with temperature information acquired by the environment sensor, and the second hardware fingerprint data.

11. A method of individual identification for identifying a storage device including one or more memory chips, the method including:
storing write data in a specific region in each memory chip;
generating hardware fingerprint data based on mismatch bits between the write data and read data read out from the specific region in each memory chip;
acquiring first temperature information about the storage device;
storing the hardware fingerprint data and the first temperature information, while associating each other, in a specific storage region which is different from the one or more memory chips;
generating new hardware fingerprint data using read data newly read out from the specific region in each memory chip and the write data;
acquiring second temperature information about the storage device; and
identifying the storage device by collating the hardware fingerprint data, which is being stored in the specific storage region which is different from the one or more memory chips while being associated with the first temperature information corresponding to the second temperature information, and the new hardware fingerprint data.

12. A non-transitory computer-readable program product storing instructions for letting a computer processor execute individual identification of a storage device including one or more memory chips, the instructions including:
storing write data in a specific region in each memory chip;
generating hardware fingerprint data based on mismatch bits between the write data and read data read out from the specific region in each memory chip;
acquiring first temperature information about the storage device;
storing the hardware fingerprint data and the first temperature information, while associating each other, in a specific storage region which is different from the one or more memory chips;
generating new hardware fingerprint data using read data newly read out from the specific region in each memory chip and the write data;
acquiring second temperature information about the storage device; and
identifying the storage device by collating the hardware fingerprint data, which is being stored in the specific storage region which is different from the one or more memory chips while being associated with the first temperature information corresponding to the second temperature information, and the new hardware fingerprint data.

* * * * *